(12) United States Patent
Nanahara et al.

(10) Patent No.: US 11,098,778 B2
(45) Date of Patent: Aug. 24, 2021

(54) ELECTRIC BRAKE ACTUATOR

(71) Applicant: TOYOTA JIDOSHA KABUSHIKI KAISHA, Toyota (JP)

(72) Inventors: Masaki Nanahara, Toyota (JP); Naoki Yabusaki, Toyota (JP); Yuta Morikawa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 10 days.

(21) Appl. No.: 16/356,070

(22) Filed: Mar. 18, 2019

(65) Prior Publication Data
US 2019/0293134 A1 Sep. 26, 2019

(30) Foreign Application Priority Data
Mar. 20, 2018 (JP) .............................. JP2018-052707

(51) Int. Cl.
*F16D 65/18* (2006.01)
*F16F 1/06* (2006.01)
(Continued)

(52) U.S. Cl.
CPC .............. *F16D 65/18* (2013.01); *F16F 1/065* (2013.01); *B60T 1/065* (2013.01); *F16D 65/52* (2013.01); *F16D 2055/0029* (2013.01); *F16D 2065/1396* (2013.01); *F16D 2121/24* (2013.01); *F16D 2125/40* (2013.01); *F16D 2127/02* (2013.01); *F16D 2129/04* (2013.01); *F16F 2226/04* (2013.01)

(58) Field of Classification Search
CPC .... F16D 65/18; F16D 2125/40; F16D 65/183; F16D 65/186; F16D 67/02; F16D 67/06; B60T 1/065
See application file for complete search history.

(56) References Cited

U.S. PATENT DOCUMENTS 3,767,016 A * 10/1973 Hurt ....................... F16D 65/567
188/71.9
4,392,558 A * 7/1983 Heibel .................... F16D 65/22
188/325
(Continued)

FOREIGN PATENT DOCUMENTS

JP 2013-024389 A 2/2013
JP 2017-197164 A 11/2017
KR 10-2017-0068799 A 6/2017

*Primary Examiner* — Xuan Lan Nguyen
(74) *Attorney, Agent, or Firm* — Sughrue Mion, PLLC

(57) ABSTRACT

An electric brake actuator configured to push a friction member onto a rotary body by advancing a piston by rotating an input shaft by an electric motor, including: a torque imparting device configured to impart, to an input shaft, a torque in a direction to retract a piston based on an elastic torque of a torsion spring and including a mechanism configured to allow a first retained portion provided at one end portion of the torsion spring to be retained by another one of a plurality of first retaining portions of a stator when the elastic torque exceeds a set upper-limit torque to decrease the elastic torque; and a mechanism configured to permit a second retained portion of a rotor to be retained by a second retaining portion provided at the other end portion of the spring to prohibit the elastic torque from becoming smaller than a set lower-limit torque.

8 Claims, 8 Drawing Sheets

(51) Int. Cl.

| | |
|---|---|
| *B60T 1/06* | (2006.01) |
| *F16D 121/24* | (2012.01) |
| *F16D 125/40* | (2012.01) |
| *F16D 127/02* | (2012.01) |
| *F16D 129/04* | (2012.01) |
| *F16D 65/52* | (2006.01) |
| *F16D 65/02* | (2006.01) |
| *F16D 55/00* | (2006.01) |

(56) References Cited

U.S. PATENT DOCUMENTS

| | | | | |
|---|---|---|---|---|
| 5,829,557 | A | * | 11/1998 | Halasy-Wimmer .......................... B60T 13/741 188/162 |
| 8,051,957 | B2 | * | 11/2011 | Giering ................ B60T 13/741 188/72.8 |
| 9,527,584 | B2 | * | 12/2016 | Rehfus .................... B64C 25/44 |
| 9,568,058 | B2 | * | 2/2017 | Sakashita ................ F16D 65/18 |
| 9,732,813 | B2 | * | 8/2017 | Severinsson .......... F16D 65/092 |
| 2013/0264153 | A1 | | 10/2013 | Baukholt et al. |
| 2014/0069751 | A1 | * | 3/2014 | Park ................... F16D 65/0075 188/72.4 |
| 2017/0314627 | A1 | * | 11/2017 | Hyun ..................... F16D 65/18 |

* cited by examiner

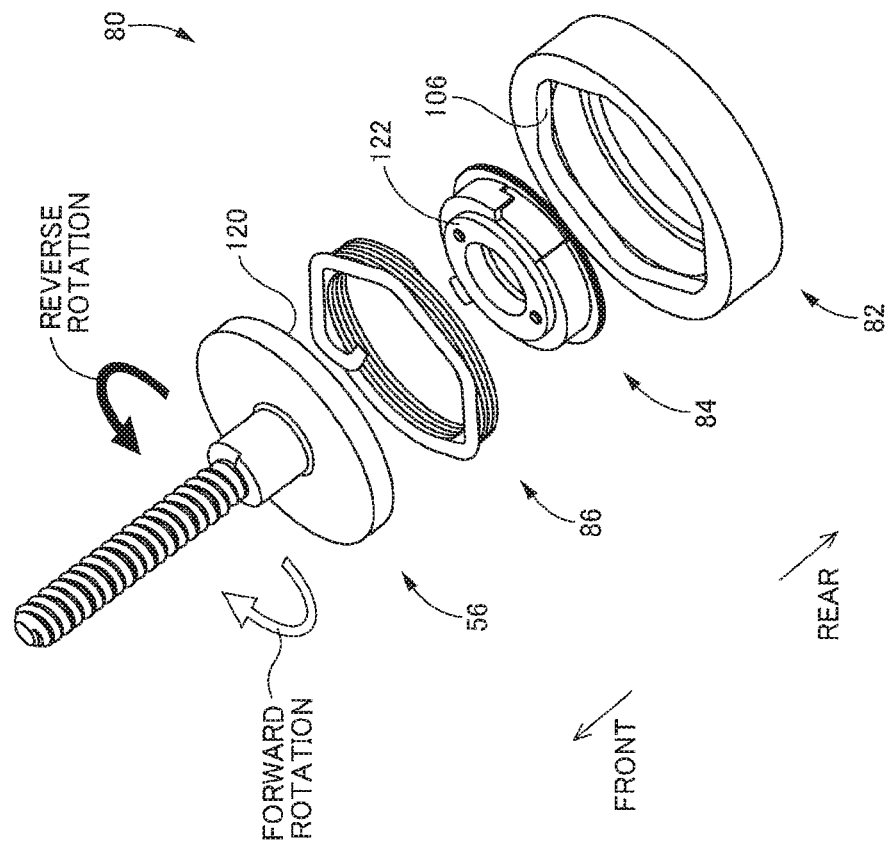
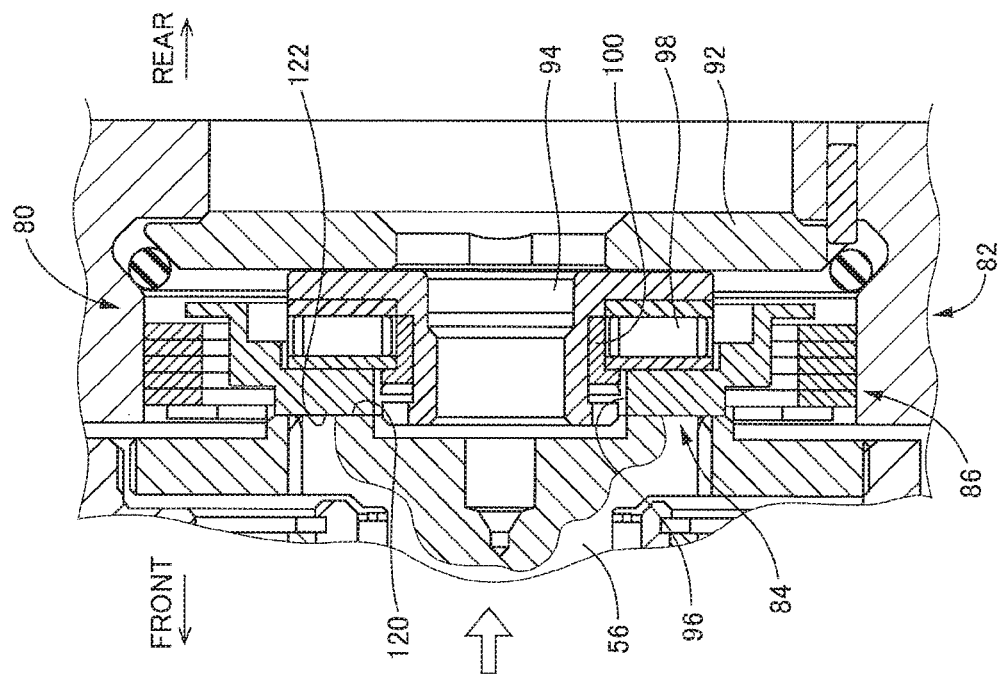

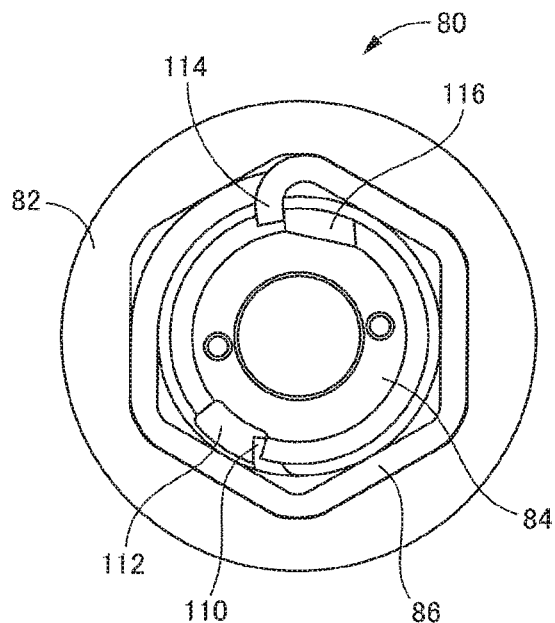 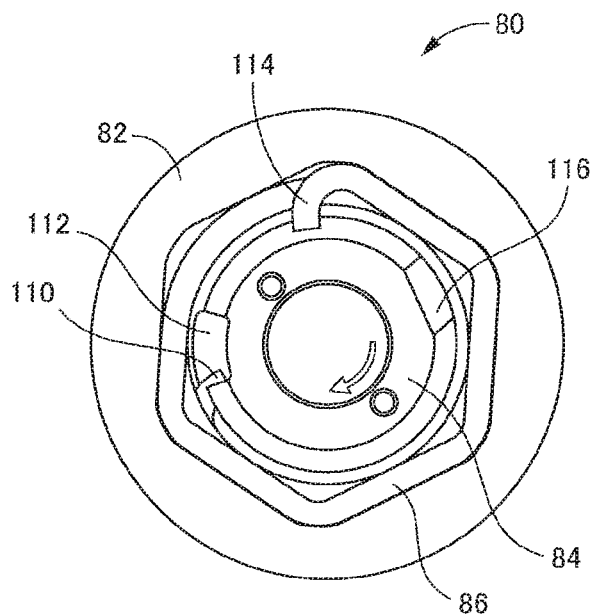
FIG.5A   FIG.5B
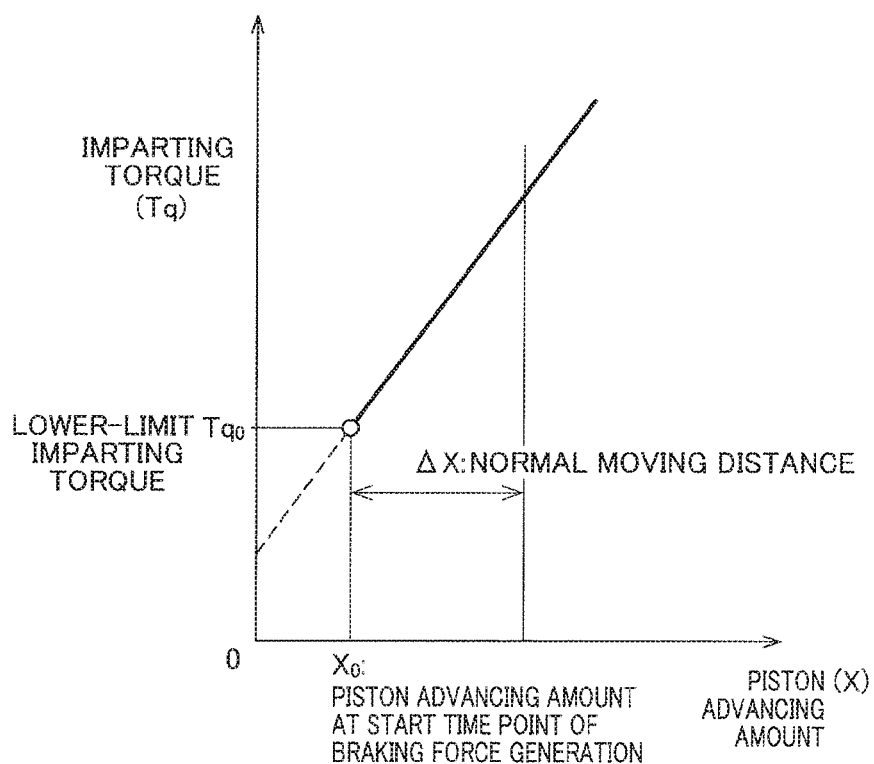
FIG.5C

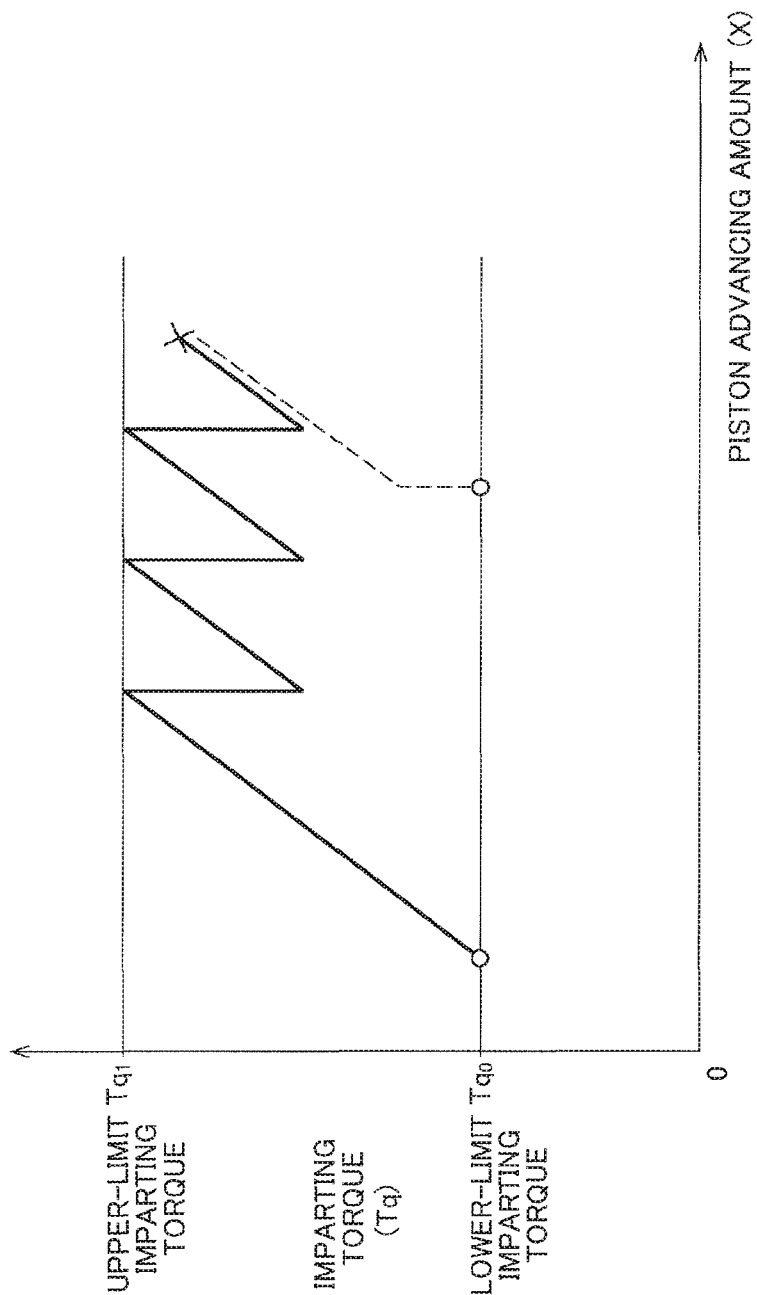

ELECTRIC BRAKE ACTUATOR

CROSS REFERENCE TO RELATED APPLICATION

The present application claims priority from Japanese Patent Application No. 2018-052707, which was filed on Mar. 20, 2018, the disclosure of which is herein incorporated by reference in its entirety.

BACKGROUND

Technical Field

The following disclosure relates to an electric brake actuator configured to give a braking force to a wheel by a force of an electric motor.

Description of Related Art

There has been developed an electric brake actuator (hereinafter simply referred to as "actuator" where appropriate) configured to give a braking force to a wheel by pushing a friction member onto a rotary body that rotates together with the wheel. The actuator typically includes a piston, an electric motor, and a motion converting mechanism that includes an input shaft rotated by the electric motor and that is configured to convert a rotating motion of the electric motor into an advancing and retracting movement of the piston. In the case where the electric motor fails to generate a force in a state in which the piston has advanced and the braking force is being generated, the piston cannot be retracted and therefore the braking force cannot be cancelled. In view of this, the actuator is equipped with a torque imparting device configured to impart or give, to the input shaft, a torque in a direction to retract the piston in dependence on an elastic force of a torsion spring, as described in Japanese Patent Application Publication No. 2013-024389, for instance. The torque imparting device of the actuator includes a retained-position-change allowing mechanism. When the torsion spring is largely twisted and an elastic torque of the torsion spring accordingly exceeds an upper-limit torque, the retained-position-change allowing mechanism changes a retained position of one end portion of the torsion spring for decreasing the elastic torque.

SUMMARY

In the actuator of the Publication described above, after the retained-position-change allowing mechanism operates in the middle of generation of the braking force as a result of the advancing movement of the piston from the standby position, the piston is retracted back to the standby position to cancel the braking force. In this case, however, the magnitude of a set torque imparted to the input shaft is uncertain. (The set torque is a torque imparted to the input shaft in a state in which the piston is located at the standby position.) It is expected in some cases that the piston is located at the standby position in a state in which a considerably small torque is imparted to the input shaft as the set torque. This may cause the torque imparting device not to adequately function, and the actuator does not have high utility even if it is equipped with the torque imparting device. It is, on the other hand, possible to enhance the utility of the actuator by making various modifications to the actuator. Accordingly, the present disclosure is directed to the actuator having high utility.

In one aspect of the present disclosure, the electric brake actuator includes the torque imparting device which includes, in addition to the retained-position-change allowing mechanism described above, a lower-limit torque ensuring mechanism configured to prohibit the elastic torque of the torsion spring from becoming smaller than a set lower-limit torque.

Advantageous Effects

According to the electric brake actuator of the present disclosure, owing to the lower-limit torque ensuring mechanism, a torque in a direction to retract the piston can be stably imparted to the input shaft even when the retained-position-change allowing mechanism operates in a state in which the braking force is being generated. Thus, the present electric brake actuator has high utility.

Forms of the Invention

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and embodiments. It is to be further understood that, as long as the claimable invention is construed in this way, any form in which one or more constituent elements is/are added to or deleted from any one of the following forms may be considered as one form of the claimable invention.

(1) An electric brake actuator configured to push a friction member onto a rotary body that rotates together with a wheel, including:
  a main body;
  a piston held by the main body so as to be advanceable and retractable, the piston being configured to push the friction member toward the rotary body by advancing;
  an electric motor;
  a motion converting mechanism including an input shaft configured to be rotated by the electric motor, the motion converting mechanism being configured to convert a rotating motion of the electric motor into an advancing and retracting movement of the piston, and
  a torque imparting device including a torsion spring and configured to impart, to the input shaft, a torque in a direction in which the piston retracts, in dependence on an elastic torque generated by the torsion spring,
  wherein the torque imparting device includes:
    a stator fixed to the main body and configured to retain, by one of a plurality of first retaining portions thereof, a first retained portion provided at one end portion of the torsion spring;
    a rotor retaining the other end portion of the torsion spring, the rotor being configured (i) to rotate together with the input shaft relative to the stator so as to twist the torsion spring in a state in which the input shaft receives a reaction force of a force by which the piston pushes the friction member onto the rotary body and (ii) to be allowed to rotate relative to the input shaft in a state in which the input shaft does not receive the reaction force;

a retained-position-change allowing mechanism configured to allow the first retained portion provided at the one end portion of the torsion spring to be retained by another one of the plurality of first retaining portions of the stator when the elastic torque of the torsion spring exceeds a set upper-limit torque, so as to decrease the elastic torque; and a lower-limit torque ensuring mechanism configured to permit a second retained portion provided on the rotor to be retained by a second retaining portion provided at the one end portion of the torsion spring, so as to prohibit the elastic torque of the torsion spring from becoming smaller than a set lower-limit torque.

This form is a basic form of the electric brake actuator (hereinafter simply referred to as the actuator where appropriate) according to the claimable invention. The actuator of this form is configured such that, when the actuator is generating the braking force, the input shaft of the motion converting mechanism receives a reaction force of a pushing force by which the friction member is pushed onto the rotary body. In short, the actuator includes a clutch mechanism configured to rotate the rotor and the input shaft together as one unit or to allow the rotor and the input shaft to rotate relative to each other, depending upon whether or not the reaction force is being generated.

Owing to the function of the clutch mechanism, in a state in which the braking force is not being generated, the second retained portion of the rotor is retained by the second retaining portion provided at the one end portion of the torsion spring by the elastic reaction force of the torsion spring. In this state, a torsion amount (twisted amount) of the torsion spring is somewhat larger than that in a natural state of the torsion spring, and the elastic torque of the torsion spring in this state is the set lower-limit torque.

A basic operation of the torque imparting device in one brake operation will be explained. When the braking force is generated, the rotor is rotated together with the input shaft, in accordance with an increase in the braking force, in a forward rotational direction (that is the same direction as a rotational direction of the input shaft upon the advancing movement of the piston) owing to the function of the clutch mechanism, the torsion spring is twisted, and the elastic torque of the torsion spring is increased. On the other hand, the rotor is rotated in a reverse rotational direction (that is the same direction as a rotational direction of the input shaft upon the retracing movement of the piston) in accordance with a decrease in the braking force. When the braking force is no longer generated, the second retained portion of the rotor is again retained by the second retaining portion provided at the one end portion of the torsion spring by the elastic reaction force of the torsion spring if wear of the friction member is not taken into consideration. Thus, not only at a time point when the braking force starts to be generated but also at a time point when the braking force is no longer generated, the torque imparting device imparts, to the input shaft, the torque corresponding to the elastic torque of the torsion spring that is equal to the set lower-limit torque, as the imparting torque. In this sense, the lower-limit torque ensuring mechanism functions as a mechanism for ensuring or providing what is called set torque (pre-torque).

In the meantime, it is expected that the friction member is comparatively largely worn in one brake operation. This may cause the piston to be comparatively largely advanced. Such a comparatively large advancing movement of the piton causes the rotor to forwardly rotate together with the input shaft by a comparatively large amount. The forward rotating motion of the rotor causes the torsion spring to be comparatively largely twisted, resulting in a considerable increase in the elastic torque of the torsion spring. Such a large elastic torque puts an excessive load on the torque imparting device. In addition, an excessive imparting torque corresponding to the large elastic torque is imparted to the input shaft. Accordingly, in the case where the braking force is increased or maintained, it is needed to advance the piston or to maintain the advanced position of the piton against the excessive imparting torque. The retained-position-change allowing mechanism functions in order to obviate such a situation. According to the retained-position-change allowing mechanism of this form, the retained position of the first retained portion is changed, so that the torsion spring does not generate the elastic torque higher than the set upper-limit torque. Thus, it is possible to obviate generation of the excessive imparting torque.

The actuator of this form includes the lower-limit torque ensuring mechanism, in addition to the retained-position-change allowing mechanism. Accordingly, even when the retained-position-change allowing mechanism operates, the lower-limit torque ensuring mechanism enables the imparting torque to be stably imparted to the input shaft for retracting the piston, without depending on the force of the electric motor. That is, this form enables construction of the actuator with high utility owing to the functions of the retained-position-change allowing mechanism, the lower-limit torque ensuring mechanism, and the clutch mechanism.

(2) The electric brake actuator according to the form (1), wherein the torsion spring is a torsion coil spring formed by winding a wire in a plurality of turns.

The torque imparting device may employ, as the torsion spring, various springs such as a spiral spring and a torsion coil spring. The torsion coil spring as employed in this form enables the torque imparting device to have a reduced diametrical dimension and accordingly enables the actuator to have a reduced diametrical dimension, as compared with an arrangement that employs the spiral spring, for instance.

(3) The electric brake actuator according to the form (2), wherein the torsion coil spring is formed by winding, in a plurality of turns, the wire whose cross section is a quadrangle.

In the case where the torque imparting device employs the torsion coil spring formed by winding, in a plurality of turns, a wire whose cross section is a quadrangle, the torsion coil spring has a larger spring constant than a torsion coil spring having the same outer dimension and formed by winding, in a plurality of turns, a wire whose cross section is a circle. Conversely, the torsion coil spring having a smaller size can be employed for generating the same magnitude of the elastic torque. In this form, the torque imparting device is made compact, and the actuator is accordingly made compact.

(4) The electric brake actuator according to the form (2) or (3), wherein the first retained portion is formed by bending the wire at the one end portion of the torsion spring, and each of the plurality of first retaining portions is formed as a recessed portion capable of retaining the first retained portion.

The first retaining portion and the first retained portions according to this form can be comparatively easily formed.

(5) The electric brake actuator according to any one of the forms (1) through (4), wherein the retained-position-change allowing mechanism is configured to allow the first retained portion to be retained by said another one of the plurality of first retaining portions in place of retaining of the first retained portion by the one of the plurality of first retaining portions, owing to a movement of the first retained portion provided at the one end portion of the torsion spring caused by elastic deformation of the one end portion with an increase in the elastic torque of the torsion spring.

According to this form, the position at which the first retained portion is retained by one of the plurality of first retaining portions is changed utilizing the elastic deformation of the torsion spring, so that the retained-position-change allowing mechanism can be constructed with a simple structure and therefore the torque imparting device can be constructed with a simple structure.

(6) The electric brake actuator according to any one of the forms (1) through (5), wherein the plurality of first retaining portions are arranged on one circumference of the stator, and a plurality of first retained portions, each as the first retained portion, are arranged on one circumference of the one end portion of the torsion spring.

(7) The electric brake actuator according to the form (6), wherein, where a position at which each of the plurality of first retained portions is retained by a corresponding one of the plurality of first retaining portions is defined as a retained position, the electric brake actuator includes a plurality of retained positions, and wherein at least two of the plurality of retained positions are disposed at an equiangular pitch.

According to the above two forms, the one end portion of the torsion spring is retained by the stator at a plurality of positions, thus enabling the torsion spring to be stably retained. The latter form, in particular, is effective for preventing or reducing inclination or offset of the torsion spring due to an increase in the elastic torque, making it possible to impart a more stable imparting torque to the input shaft.

(8) The electric brake actuator according to any one the forms (1) through (7), wherein the rotor includes a cutout, as a third retaining portion, into which is inserted a third retained portion provided at the other end portion of the torsion spring, so as to retain the other end portion, and the cutout has a circumferential dimension larger than that of the third retained portion.

According to this form, a clearance is provided, in the circumferential direction, between the cutout of the rotor as the third retaining portion and the third retained portion provided at the other end portion of the torsion spring. This configuration facilitates mounting of the torsion spring to the rotor and accordingly facilitates mounting of the rotor and the torsion spring to the stator. The cutout may be formed as an opening, a groove or the like.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIGS. 3A and 3B are views for explaining a torque imparting device of the electric brake actuator according to the embodiment;

FIGS. 5A-5B are views and FIG. 5C is a graph for explaining a basic operation of the torque imparting device;

FIG. 7 is a graph indicating a relationship between an advancing amount of a piston of the electric brake actuator and a torque imparted by the torque imparting device in the case where the retained-position-change allowing mechanism operates.

DETAILED DESCRIPTION OF THE EMBODIMENT

Figure 1:
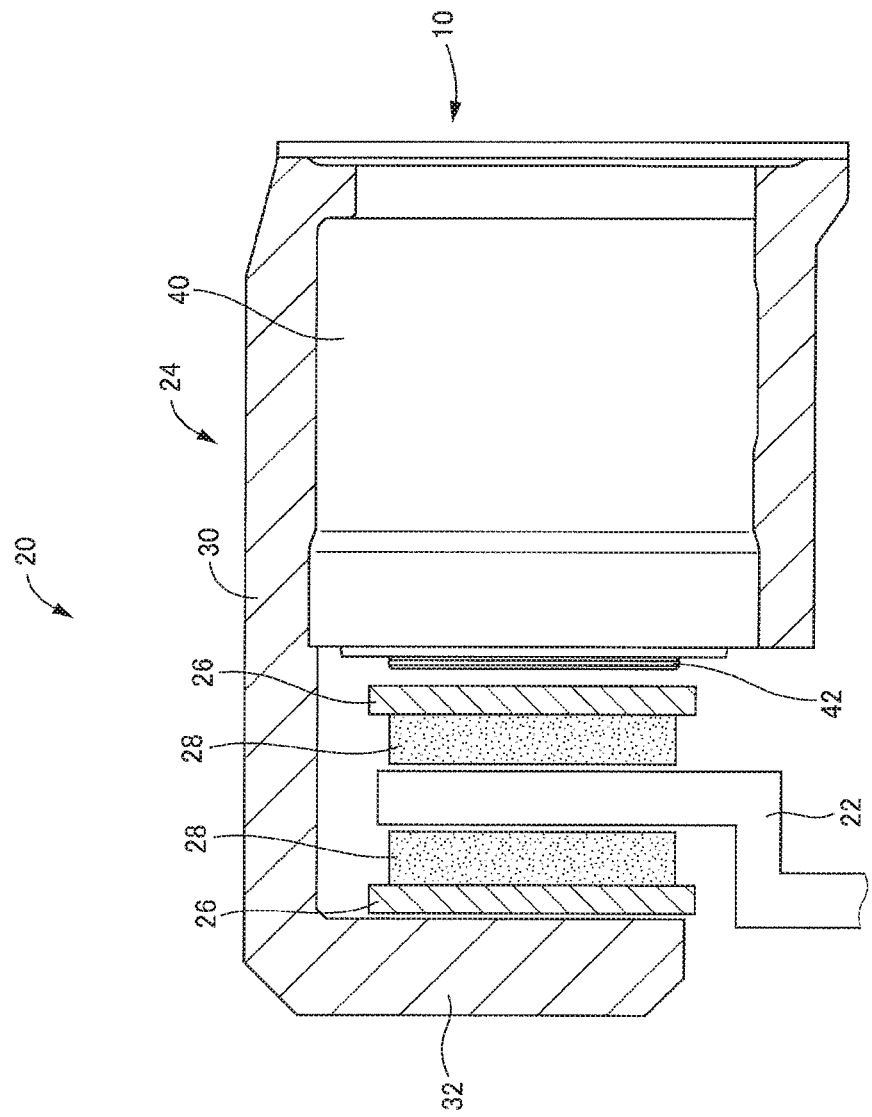
FIG. 1 is a view of an electric brake device in which is employed an electric brake actuator according to one embodiment.

Referring to the drawings, there will be explained below in detail an electric brake actuator according to one embodiment of the claimable invention and a modification thereof. It is to be understood that the claimable invention is not limited to the details of the following embodiment but may be embodied based on the forms described in Forms of the Invention and may be changed and modified based on the knowledge of those skilled in the art.

[A] Structure of Electric Brake Device

As schematically shown in FIG. 1, an electric brake actuator 10 (hereinafter simply referred to as "actuator 10" where appropriate) according to one embodiment is employed in an electric brake device 20. The electric brake device 20 includes a disc rotor 22, as a rotary body, configured to rotate together with a wheel (not shown), a brake caliper 24 held by a carrier (not shown) that rotatably holds the wheel, and a pair of brake pads 28, each as a friction member, supported by respective backup plates 26.

The brake caliper 24 is held by a mount provided in the carrier such that the brake caliper 24 straddles over the disc rotor 22 so as to be movable in an axial direction (a right-left direction in FIG. 1). The pair of brake pads 28 are held by the mount via the respective backup plates 26 so as to sandwich the disc rotor 22 therebetween in a state in which the pads 28 are movable in the axial direction.

For convenience sake, a left side and a right side in FIG. 1 are defined as a front side and a rear side, respectively. The front-side brake pad 28 is supported by a front end portion (claw portion) 32 of a main body of the brake caliper 24, i.e., a caliper main body 30. The actuator 10 is held by a rear-side portion of the caliper main body 30 such that a housing 40 of the actuator 10 is fixed. The actuator 10 includes a piston 42 configured to advance and retract relative to the housing 40. When the piston 42 advances, its front end comes into engagement with the rear-side brake pad 28, specifically, the backup plate 26 supporting the rear-side brake pad 28. When the piston 42 further advances, the pair of brake pads 28 sandwich the disc rotor 22 therebetween. In other words, the brake pads 28 are pushed onto the disc rotor 22. Owing to the pushing of the brake pads 28 onto the disc rotor 22, there is generated a braking force for stopping rotation of the wheel that depends on a friction force between the disc rotor 22 and the brake pads 28. That is, there is generated a braking force for reducing a speed of the vehicle or stopping the vehicle.

[B] Structure of Electric Brake Actuator

Figure 2:
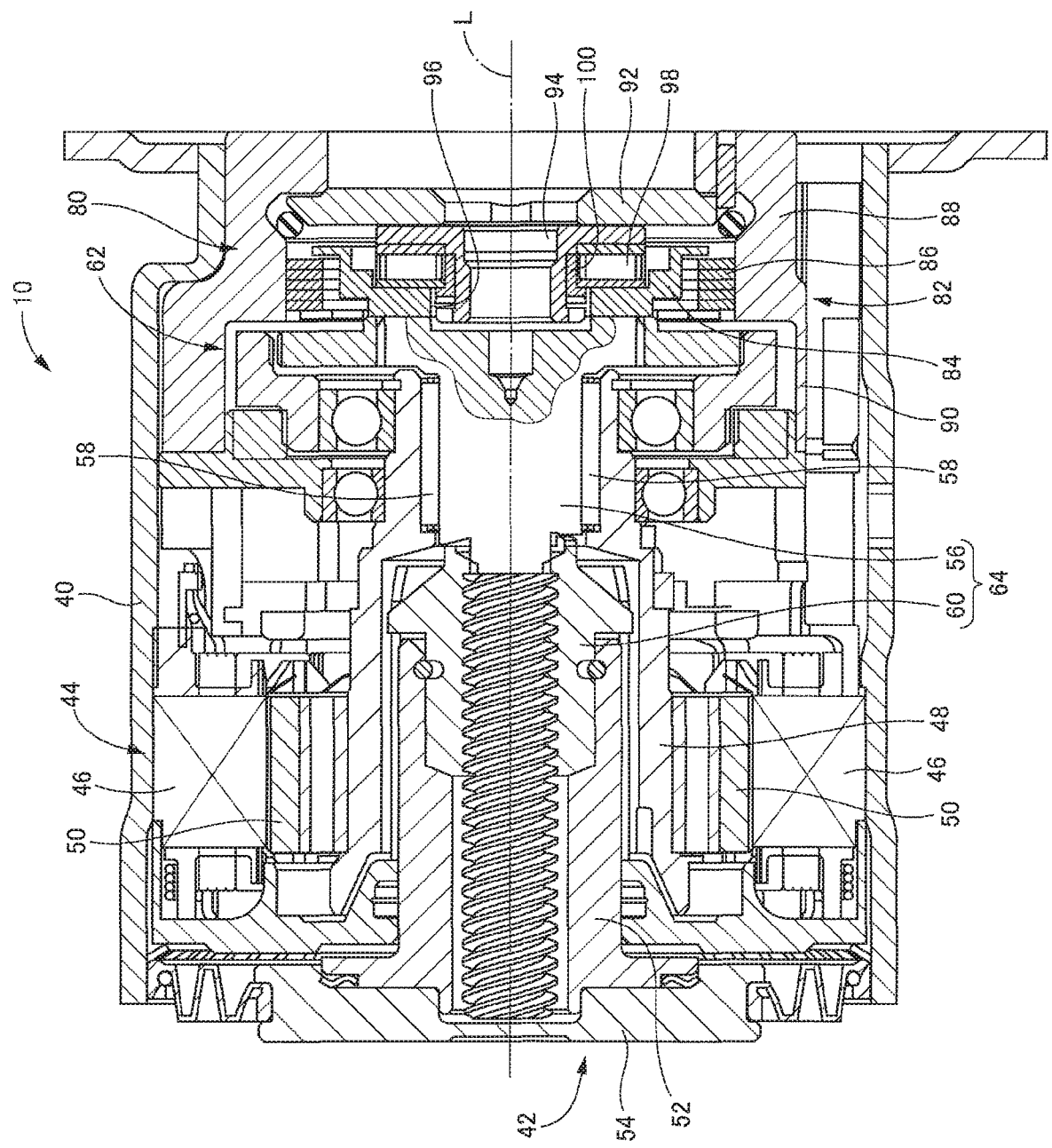
FIG. 2 is a cross-sectional view of the electric brake actuator according to the embodiment.

As shown in FIG. 2, the actuator 10 includes an electric motor 44 housed in the housing 40 as a main body of the actuator 10. The electric motor 44 is a DC brushless motor including coils 46 fixed to an inner circumferential portion of the housing 40 so as to be disposed on one circumference, a generally cylindrical motor shaft 48 rotatably held by the housing 40, and magnets 50 fixed to an outer circumferential portion of the motor shaft 48 so as to be opposed to the coils 46. An axis of the electric motor 44 coincides with an axis L of the actuator 10. In the following explanation, a left side and a right side in FIG. 2 are defined as a front side and a rear side, respectively, as in FIG. 1.

The piston 42 includes: a cylindrical member 52 having a generally cylindrical shape; and a lid member 54 that closes a front end of the cylindrical member 52. The cylindrical member 52 is disposed in the motor shaft 48 of the electric motor 44. In the cylindrical member 52, an input shaft 56 having external threads formed on its outer circumferential portion is disposed via the motor shaft 48 and a roller 58 so as to be rotatable relative to the motor shaft 48 and the housing 40 and so as to be immovable in the axial direction. A nut 60 having internal threads threadedly engaging with the external threads of the input shaft 56 is fixed to a rear end portion of the cylindrical member 52, so as to be unrotatable relative to the housing 40. Rotation of the input shaft 56 causes the piston 42 to be advanced or retracted relative to the housing 40. An axis of the piston 42 and an axis of the input shaft 56 coincide with the axis L.

The motor shaft 48 of the electric motor 44 and the input shaft 56 are coupled to each other via a speed reducer 62. Though not explained in detail, the speed reducer 62 is what is called cycloidal speed reducer and has a large speed reduction ratio. Accordingly, a rotational speed of the input shaft 56 is made considerably lower than a rotational speed of the motor shaft 48. The input shaft 56 and the nut 60 constitute a motion converting mechanism 64 configured to convert a rotating motion of the electric motor 44 to an advancing and retracting movement of the piston 42. The piston 42 is advanced and retracted by rotation of the motor shaft 48, namely, by rotation of the electric motor 44.

In the following explanation, rotation of the electric motor 44 and the input shaft 56 in a direction in which the piston 42 is advanced will be referred to as forward rotation, and rotation of the electric motor 44 and the input shaft 56 in a direction in which the piston 42 is retracted will be referred to as reverse rotation.

Hereinafter, there will be briefly explained control of the actuator 10 for permitting the electric brake device 20 to generate the braking force, i.e., control of the electric motor 44. As explained above, the braking force is proportional to a force by which the piston 42 pushes brake pads 28 onto the disc rotor 22. A reaction force of that force is received by the housing 40 via the input shaft 56. While not shown, the actuator 10 includes a reaction-force sensor (load cell) for detecting the reaction force. An electric current supplied to the electric motor 44 is controlled such that the reaction force detected by the reaction-force sensor becomes equal to a value in accordance with a target braking force, whereby the braking force is controlled.

In short, when the electric motor 44 is forwardly rotated so as to advance the piston 42, the brake pads 28 come into contact with the disc rotor 22 and the braking force, i.e., the reaction force, is generated from a time point of the contact of the brake pads 28 and the disc rotor 22. When the piston 42 further advances from the time point, the brake pads 28 are elastically deformed and the braking force proportional to the advancing amount of the piston 42 is obtained. On the contrary, when the electric motor 44 is reversely rotated so as to retract the piston 42 in a state in which the braking force is being generated, the braking force is decreased and finally not generated when the brake pads 28 are separated away from the disc rotor 22.

[C] Torque Imparting Device

A case is considered in which the electric motor 44 fails to operate or a controller or the like to control the electric motor 44 fails to operate, in other words, a case is considered in which there occurs a failure in which the piston 42 cannot be retracted by the electric motor 44. When the failure occurs in a state in which the electric brake device 20 is generating the braking force, the piston 42 cannot be retracted by the electric motor 44, and the braking force is kept generated because the negative efficiency (reverse efficiency) of the motion converting mechanism 64 is comparatively small. Thus, what is called drag state is continued. In view of such a situation, the present actuator 10 is equipped with a torque imparting device 80 configured to impart a torque in the reverse rotational direction to the input shaft 56 for retracting the piston 42 without relying on the electric motor 44.

i) Structure of Torque Imparting Device

Referring to a partly enlarged view of the actuator 10 in which the torque imparting device 80 is disposed (FIG. 3A) and an exploded view of the torque imparting device 80 (FIG. 3B), the torque imparting device 80 will be explained. The torque imparting device 80 includes: a stator 82 having a generally cylindrical shape and fixed to the housing 40; and a rotor 84 and a return spring 86 disposed in the stator 82. (The return spring 86 will be simply referred to as "spring 86" where appropriate.) An axis of the torque imparting device 80, namely, an axis of the stator 82, coincides with the axis L of the actuator 10. Though the stator 82 is fixed to the housing 40, the stator 82 may be regarded as a part of the housing 40. That is, the stator 82 is disposed fixedly relative to the housing 40 as the main body.

Figure 4A:
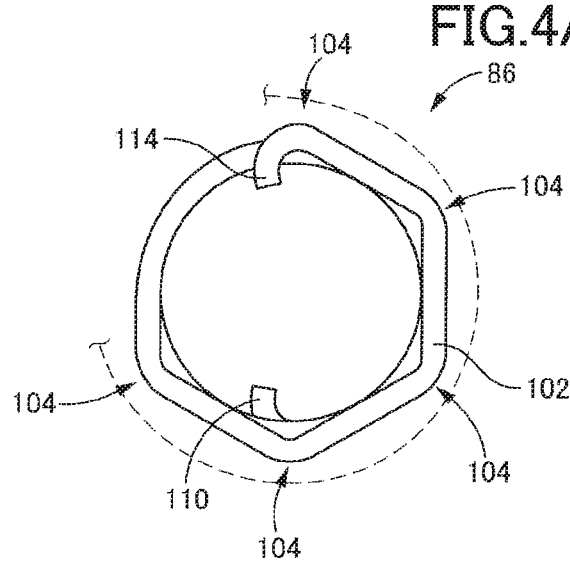
FIGS. 4A-4C are views respectively illustrating a return spring, a rotor, and a stator of the torque imparting device
Figure 4B:
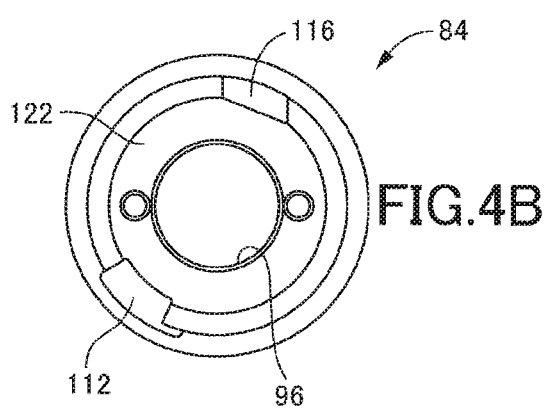
Figure 4C:
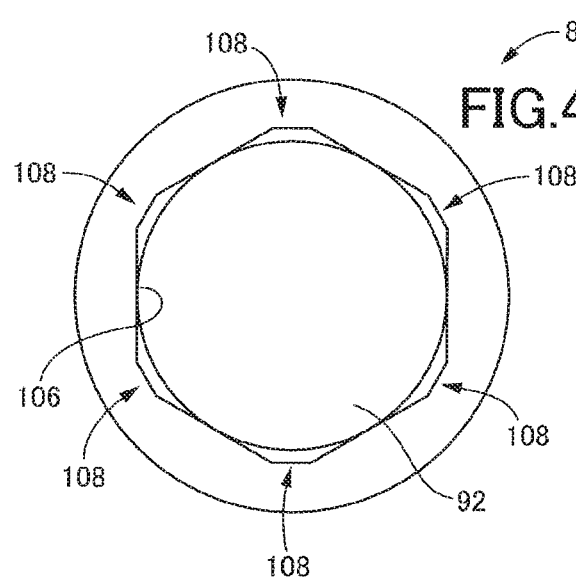
Figure 4D:
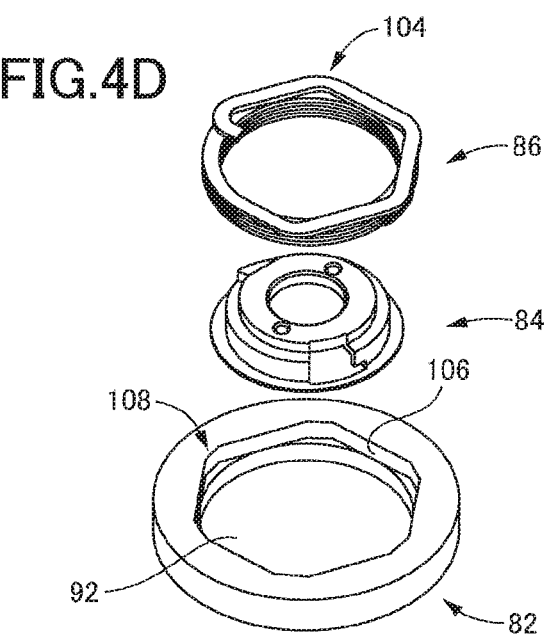
FIGS. 4D and 4E are views for explaining assembling of the return spring, the rotor, and the stator.
Figure 4E:
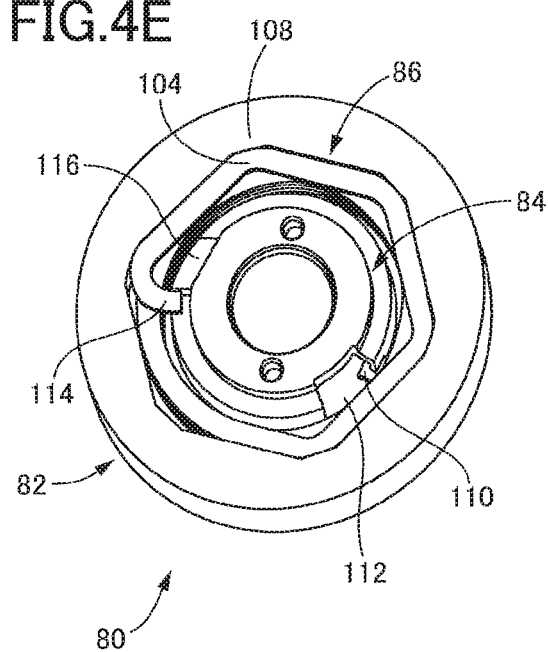

As apparent from FIG. 2, the stator 82 is actually divided into a body portion 88 and an extending portion 90 that extends forward from the body portion 88. In FIG. 3B and subsequent drawings, only the body portion 88 is illustrated for easy understanding. Hereinafter, the illustration of only the body portion 88 will be regarded as the stator 82 where appropriate. The torque imparting device will be explained referring to FIG. 4A, FIG. 4B, and FIG. 4C respectively illustrating the spring 86, the rotor 84, and the stator 82 (only the body portion 88 being illustrated), FIG. 4D illustrating an exploded state of the torque imparting device 80 seen from a different viewpoint, and FIG. 4E illustrating a state in which the stator 82, the rotor 84, and the spring 86 are assembled into the torque imparting device 80.

The stator 82 has a generally cylindrical shape and holds, at its rear portion, a circular support plate 92. A flanged cylindrical shaft 94 is attached to the support plate 92. The rotor 84 has a stepped hat-like shape, and a circular hole 96 is formed at a central portion of its front end. With the flanged cylindrical shaft 94 inserted into the circular hole 96, the rotor 84 is rotatably supported, in the stator 82, by the support plate 92 via a thrust bearing 98. A collar 100 is disposed between an outer circumference of the flanged cylindrical shaft 94 and an inner circumference of the thrust bearing 98. The flanged cylindrical shaft 94, the thrust bearing 98, and the collar 100 are not illustrated in FIGS. 3B, 4D, and 4E. In addition, the support plate 92 is not illustrated in FIG. 3B.

The spring 86 is a torsion coil spring (one example of a torsion spring) formed by winding, in a plurality of turns, a wire whose cross section is a quadrangle. One end portion 102 of the spring 86 located on a front-end side thereof, i.e., a portion of the spring 86 corresponding to a region indicated by the dashed line in FIG. 4A, is bent at a plurality of locations (i.e., five locations) and has a shape similar to an outline of a regular hexagon. That is, the one end portion 102 of the spring 86 includes a plurality of bent portions 104, i.e., five bent portions 104, arranged on one circumference at a 60° pitch. A portion of the spring 86 located rearward of the one end portion 102 is a short cylindrical portion formed by winding the wire circularly. The five bent portions 104 protrude radially outward of the outer circumference of the cylindrical portion.

The stator 82 has an opening 106 on its front-end side. The opening 106 is shaped like a regular hexagon whose vertexes are rounded. That is, six diametrically recessed portions 108 are arranged at a 60° pitch in the opening 106. The spring 86 is disposed in the stator 82 such that the one end portion 102 is fitted in the opening 106. In a state in which the spring 86 is disposed in the stator 82, the five bent portions 104 formed at the one end portion 102 of the spring 86 are retained by five of the six recessed portions 108 of the stator 82 as shown in FIG. 4E, whereby the spring 86 is prohibited from rotating relative to the stator 82 about the axis L. That is, each of the six recessed portions 108 of the stator 82 functions as a first retaining portion, and each of the five bent portions 104 of the spring 86 functions as a first retained portion to be retained by the first retaining portion.

The spring 86 is disposed such that the cylindrical portion thereof is interposed between an inner circumferential wall of the stator 82 and an outer circumferential wall of the rotor 84. The other end portion of the spring 86 located on a rear-end side thereof includes, at its distal end, a first hook portion 110 inwardly bent into a hook-like shape. The rotor 84 has a cutout 112 formed by cutting a part of its circumferential wall. The first hook portion 110 of the spring 86 is retained by the cutout 112. The direction of rotation of the spring 86 and the rotor 84 about the axis L is defined as follows. As shown in FIG. 3B, the rotation of the spring 86 and the rotor 84 in the same direction as the direction of the rotation of the input shaft 56 for advancing the piston 42 will be referred to as forward rotation, and the rotation of the spring 86 and the rotor 84 in a direction opposite to the direction of the rotation of the input shaft 56 for advancing the piston 42 will be referred to as reverse rotation. In a state in which the first hook portion 110 is retained by the cutout 112, reverse rotation of the other end portion of the spring 86 relative to the rotor 84 is prohibited. In other words, forward rotation of the rotor 84 relative to the other end portion of the spring 86 is prohibited.

A distal end of the one end portion 102 of the spring 86 is inwardly bent into a hook-like shape. That is, the one end portion 102 includes, at its distal end, a second hook portion 114. The rotor 84 includes, on its front-end side, a protruding portion 116 fixedly provided on its outer circumferential wall. The protruding portion 116 diametrically protrudes from a predetermined position, in the circumferential direction, of the outer circumferential wall of the rotor 84. In a state in which the protruding portion 116 is retained by the second hook portion 114, reverse rotation of the rotor 84 relative to the one end portion 102 of the spring 86 is prohibited. In other words, forward rotation of the one end portion 102 of the spring 86 relative to the rotor 84 is prohibited. That is, the second hook portion 114 functions as a second retaining portion, and the protruding portion 116 of the rotor 84 functions as a second retained portion to be retained by the second retaining portion.

In the state shown in FIG. 4E, namely, in a mounted state in which the rotor 84 and the spring 86 are mounted to the stator 82, the first hook portion 110 is retained by the cutout 112, and the protruding portion 116 is retained by the second hook portion 114. In this mounted state, the spring 86 is in a state in which the spring 86 is twisted to a certain degree with respect to an unloaded state (natural state) in which no external force is acting on the spring 86. That is, the spring 86 is in a state in which the spring 86 can impart, to the rotor 84, an elastic torque in a direction to rotate the rotor 84 reversely. Further, because the spring 86 is retained at the one end portion 102 thereof by the stator 82, the spring 86 is generating the elastic torque in the direction to rotate the rotor 84 reversely relative to the stator 82. Further, in such a state, the reverse rotation of the rotor 84 relative to the one end portion 102 of the spring 86 is prohibited. Thus, the elastic torque may be referred to as a set torque (pre-torque) set as a lower limit of the elastic torque to be generated by the spring 86. In this configuration, the protruding portion 116 of the rotor 84 and the second hook portion 114 provided at the one end portion 102 of the spring 86 constitute a lower-limit torque ensuring mechanism configured to prohibit the elastic torque of the spring 86 from becoming smaller than the set lower-limit torque.

The first hook portion 110 of the other end portion of the spring 86 functions as a third retained portion, and the cutout 112 of the rotor 84 functions as a third retaining portion to retain the third retained portion. The cutout 112 has a circumferential dimension larger than that of the first hook portion 110. In mounting the rotor 84 and the spring 86 to the stator 82, the rotor 84 is initially disposed in the stator 82, and the one end portion 102 of the spring 86 at which the bent portions 104 are formed are retained by the stator 82 while inserting the first hook portion 110 of the spring 86 twisted to a certain degree into the cutout 112 from the front side. Subsequently, the spring 86 is untwisted to a certain degree, so that the rotor 84 is rotated in the reverse rotational direction by an elastic reaction force of the spring 86, and the protruding portion 116 of the rotor 84 is retained by the second hook portion 114 of the one end portion 102 of the spring 86. In this way, the rotor 84 and the spring 86 can be easily mounted to the stator 82 with the elastic torque as the set lower-limit torque maintained.

While not clearly shown in FIG. 3A, there exists a slight clearance between the rear end face 120 of the input shaft 56 and the front end face 122 of the rotor 84 in a state in which the torque imparting device 80 is disposed in the actuator 10. In other words, the rear end face 120 of the input shaft 56 and the front end face 122 of the rotor 84 are about to contact each other.

ii) Basic Operation of Torque Imparting Device

As explained above, the forward rotation of the input shaft 56 by the electric motor 44 causes the piston 42 to be advanced and causes the brake pads 28 to be pushed onto the disc rotor 22, so that the braking force is generated. In a state in which the braking force is being generated, the input shaft 56 receives a reaction force of a pushing force by which the brake pads 28 are pushed onto the disc rotor 22, as indicated by a white arrow in FIG. 3A. Owing to the reaction force of the pushing force, the rear end face 120 of the input shaft 56 and the front end face 122 of the rotor 84 come into contact with each other so as to be pushed onto each other, so that a friction force is generated between the rear end face 120 and the front end face 122. In short, owing to the friction force, the input shaft 56 and the rotor 84 are rotated together as a unit in a period during which the braking force is being generated. That is, the torque imparting device 80 includes a clutch mechanism utilizing friction and constituted by the front end face 122 of the rotor 84 and the rear end face 120 of the input shaft 56.

When the electric motor 44 is forwardly rotated and the piston 42 is thereby advanced to generate the braking force, the state of the torque imparting device 80 is changed from a state shown in FIG. 5A at a start time point of generation of the braking force to a state shown in FIG. 5B. Specifically, when the rotor 84 starts rotating forwardly, the retaining of the protruding portion 116 of the rotor 84 by the second hook portion 114 of the spring 86 is cancelled. Subsequently when the rotor 84 further rotates forwardly, the spring 86 is further twisted by an amount corresponding to the amount of the forward rotation of the rotor 84 while the first hook portion 110 of the spring 86 is kept retained by the cutout 112 of the rotor 84. That is, the elastic torque of the spring 86 increases by a magnitude corresponding to the amount of the forward rotation of the rotor 84. This elastic torque acts on the input shaft 56 as a torque in a direction in which the piston 42 is retracted, namely, as a torque in the reverse rotational direction. Here, the torque that acts on the input shaft 56 is referred to as an imparting torque. The piston 42 is advanced against the imparting torque after the braking force has been generated.

The forward rotational amount of the rotor 84 and an amount of the advancing movement of the piston 42 (hereinafter referred to as "piston advancing amount" where appropriate) are proportional, and a relationship between the piston advancing amount and the imparting torque is represented by a graph of FIG. 5C. When the piston advancing amount X increases and becomes equal to an advancing amount $X_0$ at the start time point of braking force generation (that is an amount of the advancing movement of the piston 42 at the time point when the braking force starts to be generated), the braking force starts to be generated and thereafter increases with an increase in the piston advancing amount X. As explained above, the spring 86 exerts the set lower-limit torque owing to the lower-limit torque ensuring mechanism. Thus, at a time point when the piston advancing amount X exceeds the advancing amount $X_0$, there is given, to the input shaft 56, a lower-limit imparting torque $Tq_0$, as the imparting torque Tq, corresponding to the set lower-limit torque. From then onwards, the imparting torque Tq increases in proportion to the piston advancing amount X. The magnitude of the braking force being generated depends on the elastic deformation amount of the brake pads 28. Accordingly, the magnitude of the braking force being generated is generally proportional to the piston advancing amount X increased from the advancing amount $X_0$ if wear of the brake pads 28 is not taken into consideration.

When the electric motor 44 is reversely rotated to decrease the braking force being currently generated, the input shaft 56 is also reversely rotated. In accordance with the reverse rotation of the input shaft 56, the imparting torque Tq decreases to a value at a time point when the protruding portion 116 of the rotor 84 is retained by the second hook portion 114 of the spring 86, namely, the imparting torque Tq decreases to the lower-limit imparting torque $Tq_0$. The state of the torque imparting device 80 at this time point is the state shown in FIG. 5A. If wear or the like of the brake pads 28 is not taken into consideration, the braking force is no longer generated at the time point in question in a theoretical sense. In the case where the braking force is no longer generated before the time point, the reaction force of the pushing force is no longer generated, the input shaft 56 and the rotor 84 are allowed to rotate relative to each other, and the state of the torque imparting device 80 returns to the state shown in FIG. 5A owing to the elastic torque of the spring 86.

Here, a case is considered in which the electric motor 44 fails to operate, specifically, the electric motor 44 fails to exert a force, in a state in which the braking force is being generated. If the actuator 10 is not equipped with the torque imparting device 80, the piston 42 cannot be easily retracted in the situation in which the electric motor 44 fails to exert a force in the reverse rotational direction because of comparatively low negative efficiency (reverse efficiency) of the motion converting mechanism 64 constituted by the nut 60 and the input shaft 56 with the external threads. In an extreme case, the brake pads 28 are kept pushed onto the disc rotor 22, making it impossible to decrease the braking force being generated. That is, the drag state continues.

The present torque imparting device 80 exerts its effect in the situation in which the electric motor 44 cannot exert the force in the reverse rotational direction. Specifically, as long as the braking force is being generated, namely, as long as the rotor 84 and the input shaft 56 are rotatable together as a unit, the imparting torque Tq in the reverse rotational direction that depends on the elastic torque of the spring 86 is acting on the input shaft 56. Accordingly, even if the electric motor 44 cannot exert the force in the reverse rotational direction, the piston 42 can be retracted by the imparting torque Tq so as to cancel the braking force. That is, the vehicle is prevented from running with the braking force kept generated.

In the present torque imparting device 80, the imparting torque Tq not smaller than the lower-limit imparting torque $Tq_0$ is imparted to the input shaft 56 all the time in the state in which the braking force is being generated. This configuration enables the piston 42 to be smoothly retracted to the position at which the braking force is not generated, without depending on the force of the electric motor 44. In other words, because the stable lower-limit imparting torque $Tq_0$ is ensured, the piston 42 can be retracted with high reliability even if the electric motor 44 fails to operate in the state in which the braking force is being generated. The present torque imparting device 80 employs the spring 86 formed by a wire whose cross section is a square, and the spring 86 has a larger cross-sectional area, as compared with a spring formed by a wire whose cross section is a circle. Thus, the spring 86 can generate a comparatively large elastic torque, so that the present torque imparting device 80 has a reduced size, as compared with a torque imparting device that employs the spring formed by the wire having a circular cross section.

iii) Retained-Position-Change Allowing Mechanism

Suppose that the braking force expected to be generated in a normal brake operation is a maximum braking force. Because the braking force is proportional to the elastic deformation amount of the brake pads 28, it is expected that the piston 42 is moved, in the normal brake operation, within a region of a normal moving distance ΔX indicated in a graph of FIG. 5C. Settings of the torque imparting device 80 are made such that the imparting torque Tq takes a necessary and sufficient value in the region. It is, however, expected that one brake operation continues for a long time when the vehicle is running on a long downward slope, for instance.

That is, a situation is expected in which the driver holds the brake pedal down. In such a situation, the brake pads 28 are largely worn.

In the case where the brake pads 28 are largely worn in one brake operation, it is expected that the piston advancing amount X will considerably increase beyond the normal moving distance ΔX. The increase in the piston advancing amount X in turn causes an increase in the imparting torque Tq by the torque imparting device 80. That is, the spring 86 of the torque imparting device 80 is twisted to a considerably large extent, resulting in an excessively large load on the torque imparting device 80. Viewed differently, because the spring 86 is a torsion coil spring, the spring 86 may be possibly twisted beyond its structural limitations. Further, the piston 42 needs to be advanced against an excessively large imparting torque Tq, and the electric motor 44 may undesirably receive an excessive load. Not only the large wear of the brake pads 28 but also the increase in the imparting torque Tq and the excessive elastic deformation of the spring 86 may undesirably cause various problems to the torque imparting device 80 and the actuator 10.

Figure 6C:
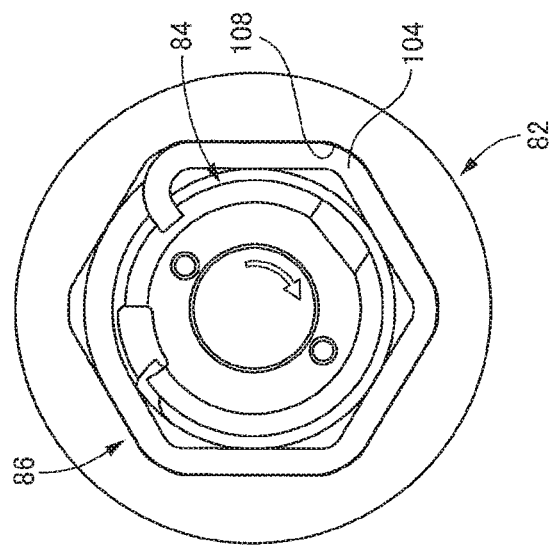
FIGS. 6A-6C are views for explaining a function of a retained-position-change allowing mechanism of the torque imparting device.
Figure 6B:
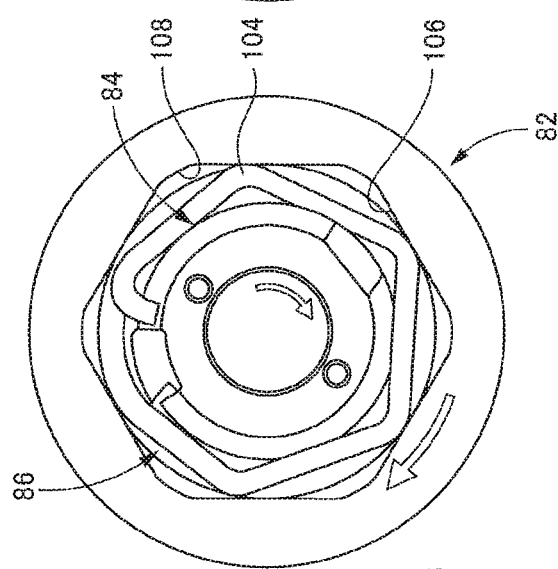
Figure 6A:
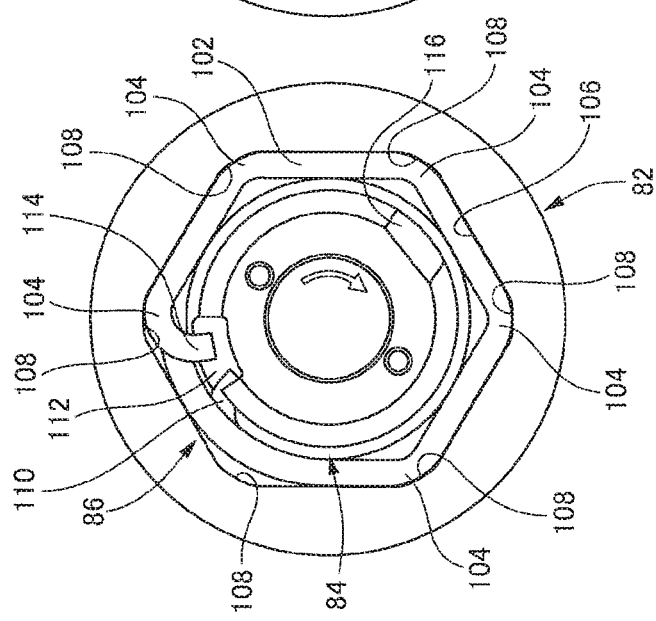

To address the problems, the present torque imparting device 80 is equipped with a retained-position-change allowing mechanism. As explained above, the spring 86 of the torque imparting device 80 is disposed in the stator 82 such that the five bent portions 104 provided at the one end portion 102 thereof are retained by respective five of the six recessed portions 108 of the stator 82. When the elastic torque exceeds a specific value, i.e., the set upper-limit torque, each of the five bent portions 104 is retained by another corresponding one of the recessed portions 108 different from one recessed portion 108 by which the bent portion 104 has been retained so far. Specifically, in a state in which the spring 86 is twisted to an extent shown in FIG. 6A, the one end portion 102 of the spring 86 is caused to be elastically deformed with its diameter being reduced as shown in FIG. 6B. That is, the one end portion 102 is elastically deformed such that the bent portions 104 get closer to the axis L. Such elastic deformation causes each bent portion 104 to slide on the inner circumferential surface of the opening 106 of the stator 82 by the elastic torque of the spring 86, so that retaining of the bent portion 104 by the recessed portion 108 that currently retains the bent portion 104 is canceled, and the bent portion 104 is newly retained by another recessed portion 108 located next to that the recessed portion 108 in the forward rotational direction, as shown in FIG. 6C. That is, the retained-position-change allowing mechanism is constituted by the bent portions 104 each as the first retained portion and the recessed portions 108 each as the first retaining portion and is configured to allow each bent portion 104 to be retained by another recessed portion 108 different from the recessed portion 108 by which the bent portion 104 has been retained so far. In short, the retained-position-change allowing mechanism is configured to allow a change of the position at which each first retained portion is retained.

The retained-position-change allowing mechanism allows each bent portion 104 to be retained by another recessed portion 108 as described above, so that the spring 86 is untwisted by an amount corresponding to the change of the retained positions, and the elastic torque is accordingly decreased. With the decrease in the elastic torque, the imparting torque Tq is decreased. Specifically, the imparting torque Tq changes as indicated in a graph of FIG. 7 with an increase in the piston advancing amount X. The graph indicates an instance in which the elastic torque exceeds, three times, the set upper-limit torque (that is a torque corresponding to an upper-limit imparting torque Tq1 in the graph) and the retained-position-change allowing mechanism operates three times. As apparent from the graph, owing to the function of the retained-position-change allowing mechanism, the imparting torque Tq does not increase beyond a certain upper limit even if the piston advancing amount X largely increases, thus preventing excessive elastic deformation of the spring 86.

When one certain brake operation is ended, the piston 42 is retracted by an amount in accordance with the braking force that has been generated by the electric brake device 20 before proceeding to the decreasing process of the braking force. After the piston 42 has been retracted, the braking force is no longer generated. This operation is the same irrespective of whether or not the retained-position-change allowing mechanism works in one brake operation as indicated in the graph of FIG. 7. Assuming that the piston 42 is advanced to a position marked with "×" in the graph and the brake operation is ended, the piston 42 is retracted in the decreasing process of the braking force, as indicated by the dashed line in the graph. After the rotor 84 is rotated together with the input shaft 56 in the reverse rotational direction by an amount corresponding to an amount by which the piston 42 has been retracted, the input shaft 56 and the rotor 84 are allowed to rotate relative to each other. After the relative rotation is allowed, the rotor 84 is rotated by the decreased elastic torque, the protruding portion 116 of the rotor 84 is retained by the second hook portion 114 of the spring 86, and the elastic torque becomes equal to the set lower-limit torque. That is, the imparting torque Tq becomes equal to the lower-limit imparting torque $Tq_0$. The graph indicates a case in which the braking force becomes equal to 0 before the protruding portion 116 is retained by the second hook portion 114. Though not explained in detail, a case may be considered in which the protruding portion 116 is retained by the second hook portion 114 before the braking force becomes equal to 0. In this case, the one end portion 102 of the spring 86 is allowed to be rotated in the reverse rotational direction such that each bent portion 104 is retained by one recessed portion 108 next thereto in the reverse rotational direction by the force of the input shaft 56 rotating in the reverse rotational direction while the lower-limit imparting torque is maintained.

As is understood from the explanation above, even if the retained-position-change allowing mechanism operates in a certain brake operation, the lower-limit torque ensuring mechanism enables the imparting torque Tq not smaller than the lower-limit imparting torque $Tq_0$ to be stably imparted to the input shaft 56 in brake operations subsequent to that brake operation. Thus, even if the electric motor 44 fails to operate in the subsequent brake operations, the piston 42 can be retracted with high reliability.

iv) Modification of Retained-Position-Change Allowing Mechanism

The retained-position-change allowing mechanism in the illustrated embodiment is constituted by the five bent portions 104, each as the first retained portion, provided at the one end portion 102 of the spring 86 and the six recessed portions 108, each as the first retaining portion, provided in the stator 82 so as to be arranged on one circumference. That is, the actuator 10 according to the illustrated embodiment employs the retained-position-change allowing mechanism including a plurality of first retained portions and a plurality of first retaining portions. In place of the retained-position-change allowing mechanism, a retained-position-change allowing mechanism including only one first retained portion may be employed, so as to construct an actuator according to a modification, as explained below.

Figure 8A:
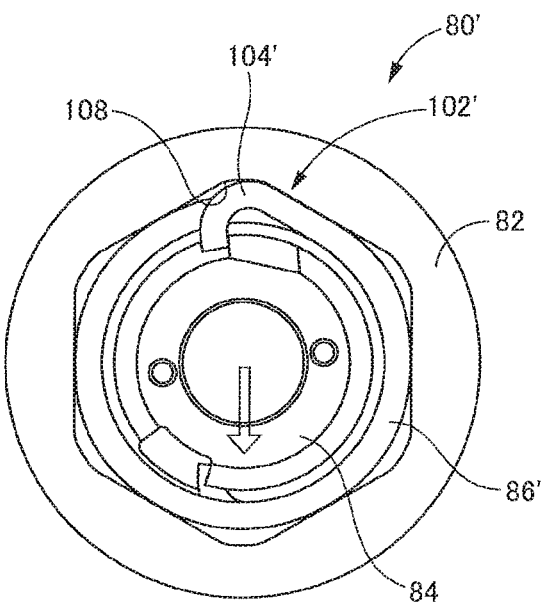
FIG. 8A is a view of a torque imparting device employed in an electric brake actuator according to a modification and FIG. 8B is a view for explaining a difference between the torque imparting device of the modification and the torque imparting device employed in the electric brake actuator of the embodiment.

Like the retained-position-change allowing mechanism explained above, the modified retained-position-change allowing mechanism shown in FIG. 8A includes the six recessed portions 108, each as the first retaining portion, provided in the stator 82. The modified retained-position-change allowing mechanism, however, includes only one bent portion 104', as the first retained portion, provided at one end portion 102' of the spring 86'. In a torque imparting device 80' that employs the retained-position-change allowing mechanism, the imparting torque not smaller than the lower-limit imparting torque $Tq_0$ can be imparted to the input shaft 56 by the lower-limit torque ensuring mechanism while preventing the elastic torque from exceeding the set upper-limit torque.

The outside diameter of the spring 86' that is a torsion coil spring becomes smaller with an increase in the elastic torque, namely, with an increase in its torsion amount (twisted amount). In the retained-position-change allowing mechanism of FIG. 8A, when the spring 86' is twisted to such an extent that a retained position of the bent portion 104' is changed from one recessed portion 108 to another recessed portion 108, it is expected that the axis of the spring 86' may be inclined relative to the axis L of the actuator 10 or may be diametrically shifted or offset relative to the axis L because the only one bent portion 104' is retained. In particular, the only one bent portion 104' is provided at the distal end of the one end portion 102', so that the front-side portion of the spring 86' is largely shifted in a direction indicated by the white arrow in FIG. 8A. In this case, the bent portion 104' as the first retained portion may fail to be stably retained. In other words, it is expected that the bent portion 104' easily slips off from the recessed portion 108 as the first retaining portion.

Figure 8B:
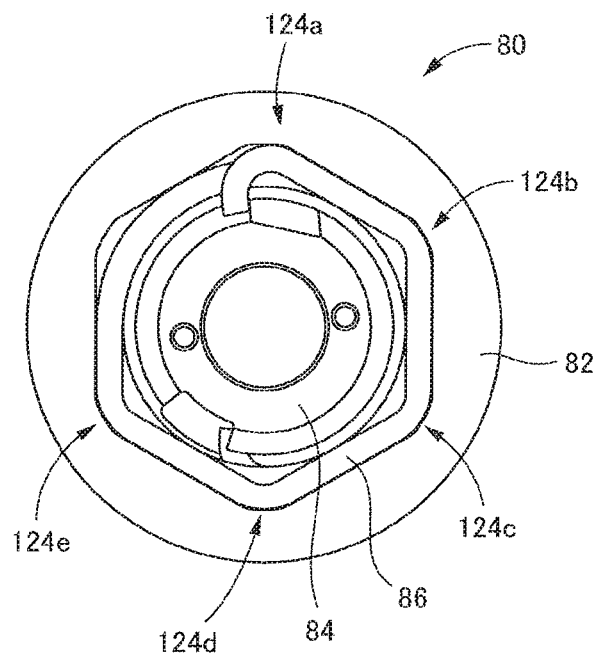

In contrast, the retained-position-change allowing mechanism of the actuator 10 according to the illustrated embodiment includes the five bent portions 104 arranged on one circumference of the one end portion 102 of the spring 86 as shown in FIG. 8B, in other words, the plurality of first retained portions are respectively retained by the plurality of first retaining portions. Thus, the present retained-position-change allowing mechanism is free from the inclination of the axis of the spring 86 relative to the axis L of the actuator 10 or the offset of the axis of the spring 86 relative to the axis L of the actuator 10. This will be more specifically explained referring to FIG. 8B. Positions at which the plurality of bent portions 104 are retained are referred to retained positions 124a-124e as shown in FIG. 8B. In the retained-position-change allowing mechanism of the actuator 10 according to the illustrated embodiment, the retained positions 124a-124e include groups of the retained positions equiangularly arranged on one circumference. Specifically, the retained positions 124a-124e include a group of the retained positions arranged at a 120° pitch (i.e. the retained positions 124a, 124c, 124e) and two groups of the retained positions arranged at a 180° pitch (i.e., the retained positions 124a, 124d and the retained positions 124b, 124e). This configuration effectively prevents or reduces an occurrence of the inclination or the offset of the axis of the spring 86 described above.

What is claimed is:

1. An electric brake actuator configured to push a friction member onto a rotary body that rotates together with a wheel, comprising:
    a main body;
    a piston held by the main body so as to be advanceable and retractable, the piston being configured to push the friction member toward the rotary body by advancing;
    an electric motor;
    a motion converting mechanism including an input shaft configured to be rotated by the electric motor, the motion converting mechanism being configured to convert a rotating motion of the electric motor into an advancing and retracting movement of the piston, and
    a torque imparting device including a torsion spring and configured to impart, to the input shaft, a torque in a direction in which the piston retracts, in dependence on an elastic torque generated by the torsion spring,
    wherein the torque imparting device includes:
        a stator fixed to the main body and configured to retain, by a first recess portion of a plurality of recess portions of the stator, a bent portion provided at one end portion in an axial direction of the torsion spring;
        a rotor retaining the other end portion in the axial direction of the torsion spring and configured to twist, by rotation thereof, the torsion spring in a state;
        a retained-position-change allowing mechanism configured to allow the bent portion provided at the one end portion of the torsion spring to be retained by a second recess portion of the plurality of recess portions of the stator when the elastic torque of the torsion spring exceeds a set upper-limit torque, so as to decrease the elastic torque; and
        a lower-limit torque ensuring mechanism configured to permit a protruding portion of the rotor to be retained by a first hook portion of the torsion spring provided at a distal end of the one end portion of the torsion spring and a cutout of the rotor, spaced apart from the protruding portion of the rotor, configured to retain a second hook portion of the torsion spring provided at a distal end of the other end portion of the torsion spring, so as to prohibit the elastic torque of the torsion spring from becoming smaller than a set lower-limit torque,
    wherein the rotor and the input shaft are coaxial, and
    wherein the torque imparting device further includes a clutch mechanism configured to allow the rotor and the input shaft to rotate together as one unit with respect to the stator in a state in which the input shaft receives a reaction force of a pushing force by which the piston pushes the friction member onto the rotary body and to allow the rotor and the input shaft to rotate relative to each other in a state in which the input shaft does not receive the reaction force.

2. The electric brake actuator according to claim 1, wherein the torsion spring is a torsion coil spring formed by winding a wire in a plurality of turns.

3. The electric brake actuator according to claim 2, wherein the torsion coil spring is formed by winding, in the plurality of turns, the wire whose cross section is a quadrangle.

4. The electric brake actuator according to claim 2, wherein the bent portion of the torsion spring is formed by bending the wire at the one end portion of the torsion spring, and each of the plurality of recess portions of the stator is formed as a recessed portion capable of retaining the bent portion of the torsion spring.

5. The electric brake actuator according to claim 1, wherein the retained-position-change allowing mechanism is configured to move the bent portion of the torsion spring to be retained by the second recess portion of the stator from the first recess portion of the stator, owing to a movement of the bent portion of the torsion spring provided at the one end portion of the torsion spring caused by elastic deformation of the one end portion of the torsion spring with an increase in the elastic torque of the torsion spring.

6. The electric brake actuator according to claim 1, wherein the plurality of recess portions of the stator are arranged on one circumference of the stator, and a plurality of bent portions of the torsion spring including the bent portion of the torsion spring are arranged on one circumference of the one end portion of the torsion spring, each of the plurality of bent portions of the torsion spring being retained by each of the plurality of recess portions of the stator.

7. The electric brake actuator according to claim 6,
wherein the electric brake actuator includes a plurality of retained positions that are positions in which each of the plurality of bent portions of the torsion spring are retained by each of the plurality of recess portions of the stator, and
wherein at least two of the plurality of retained positions are disposed at an equiangular pitch.

8. The electric brake actuator according to claim 1, wherein a length of the cutout of the rotor in a circumferential direction is larger than a length of the second hook portion of the torsion spring in the circumferential direction.

* * * * *